United States Patent [19]

Levant

[11] Patent Number: 4,490,888
[45] Date of Patent: Jan. 1, 1985

[54] CLAMPING BAND

[75] Inventor: Jean M. Levant, LeMee sur Seine, France

[73] Assignee: S.N.E.C.M.A., Paris, France

[21] Appl. No.: 479,025

[22] Filed: Mar. 25, 1983

[30] Foreign Application Priority Data

Mar. 30, 1982 [FR] France .............................. 82 05371

[51] Int. Cl.³ .............................................. F16L 3/12
[52] U.S. Cl. ................................ 24/20 R; 24/20 EE; 24/279; 24/286; 248/74.1; 285/178
[58] Field of Search ................. 24/279, 280, 281, 282, 24/284, 286, 20 R, 20 EE, 20 CW; 285/178; 248/74.7, 74.1, 74.3, 74.4

[56] References Cited

U.S. PATENT DOCUMENTS

| 1,497,549 | 6/1924 | Conradi ................................ 24/279 |
| 1,568,043 | 1/1926 | Anderson .............................. 24/279 |
| 1,788,366 | 1/1931 | Anderson ............................. 285/178 |
| 1,834,823 | 12/1931 | Bropson ............................. 285/178 |
| 1,980,080 | 11/1934 | Niles .................................... 285/178 |
| 3,010,172 | 11/1961 | Kaplan ................................. 24/279 |
| 3,061,253 | 10/1962 | Keaton . | |
| 3,409,971 | 11/1968 | Morrow ............................ 248/74.5 |
| 3,815,855 | 6/1974 | Appleton . | |
| 3,916,488 | 11/1975 | Gazda . | |
| 4,153,228 | 5/1979 | Delserro et al. ...................... 24/286 |
| 4,338,707 | 7/1982 | Byerly ................................ 248/74.7 |

FOREIGN PATENT DOCUMENTS

| 646198 | 5/1964 | Belgium . | |
| 3025601 | 1/1982 | Fed. Rep. of Germany ..... 248/74.7 |
| 2376319 | 10/1979 | France . | |
| 246072 | 8/1947 | Switzerland . | |
| 562980 | 6/1975 | Switzerland . | |
| 709838 | 6/1954 | United Kingdom . | |
| 911579 | 11/1962 | United Kingdom ................. 24/279 |

Primary Examiner—Victor N. Sakran
Attorney, Agent, or Firm—Oblon, Fisher, Spivak, McClelland & Maier

[57] ABSTRACT

The clamping-band is equipped with a split inner ring with an eccentric bore. A rigid inner half-collar partially surrounds the inner ring by means of runners forming with the ring a ball and socket device, and terminated on one side by one securing tab. A rigid outer half-collar partially covers the inner half-collar and terminates on one side in a second securing tab. The two securing tabs are equipped with oblong holes which are facing for the purposes of securing and clamping the collar.

10 Claims, 2 Drawing Figures

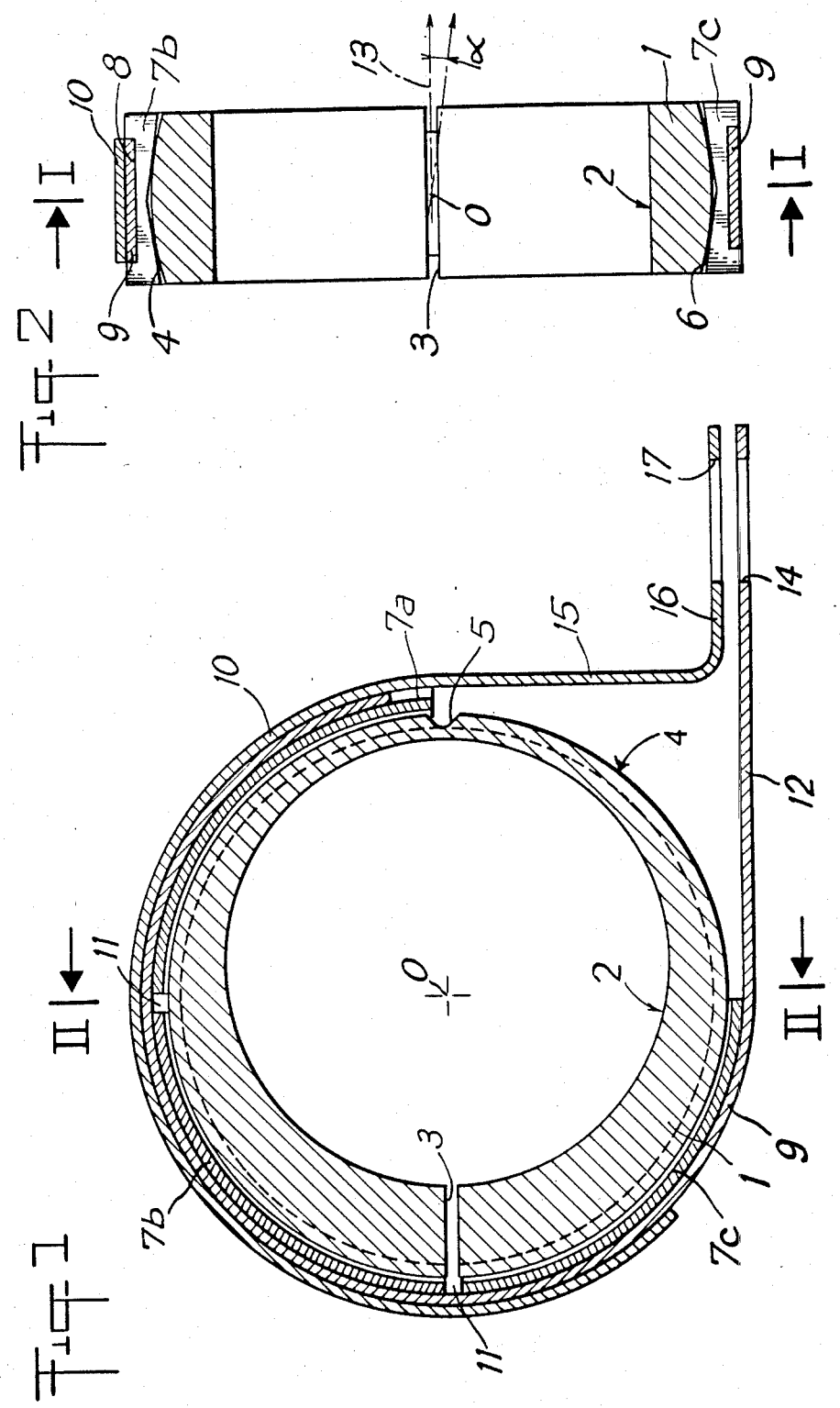

CLAMPING BAND

BACKGROUND OF THE INVENTION

1. Field of the Invention:

The invention concerns a clamping-band of the sort having a split inner ring with eccentric bore, an inner, rigid half-collar partially surrounding the inner ring and terminating in a securing tab, and a rigid, outer half-collar partially surrounding the inner half-collar and also terminating in a securing tab which can be brought opposite the first tab, each tab being provided with opposed, oblong securing holes for setting and securing the collar.

2. Description of the Prior Art:

Clamping-bands of this type have already been used, for example on rigid tubing in gas turbines. Rigid tubing is preferred to flexible tubing because of its superior mechanical performance (notably, better stability under temperature changes). However, it has the disadvantage of requiring extremely precise positioning with reference to optimal or theroretical placement. Dangerous constriction of the pipe at the position of the band can ensue if the tubing is not properly positioned.

Given these requirements, an attempt has been made to devise clamping-bands which permit a certain amount of tolerance between the actual positioning of the clamp and the theoretically optimal positioning of the tubing, without causing distortion of the tube. While this known device allows a certain amount of lateral adjustment, no angular adjustment is possible, and it positions a straight piece in the direction of the length of the tube which is not always identical to the configuration of the tubing itself, thus creating a concentration of static compression.

SUMMARY OF THE INVENTION

The object of the invention is to offer a clamping-band which, within limits, takes up all the discrepancies between the optimal and actual positioning of the tubing to be assembled.

The object of the invention, with reference to collars of the type described above, is attained by virtue of the fact that the inner half-collar surrounds and supports the inner ring by means of an intervening ball and socket device. This characteristic, combined with others, gives the clamping-band of the invention the ability to adapt to all situations and thus avoids the usual limitations of such devices by correcting for angular variations as well as any lateral misalignment.

The solution according to the invention allows assembly without static constraints and resolves the problems of tolerances and dilatation. In one application of particular interest (aeronautics), the problem of lateral and angular seizure of the tubing is especially delicate and of primary importance for safety. The invention brings an original contribution of the solution of this problem.

The ball and socket effect is brought about by giving a spherical periphery to a mobile ring rotating in one or several runners attached to the inner half-collar.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a transverse section of the collar of the invention as seen at line I—I of FIG. 2; and FIG. 2 is a radial section of the collar as seen in line II—II of FIG. 1.

DETAILED DESCRIPTION OF THE PREFERRED EMBODIMENTS

FIGS. 1 and 2 show an inner ring 1 in the form of a cylindrical crown with eccentric cylindrical bore 2 intended to surround the tube. The ring 1 has at its thickest part a radial slot 3 which allows positive clamping of the ring around the tube.

The thinnest portion of the ring, which is directly opposite the slot, is designed to be weak so that any distortion during clamping occurs here. The external periphery 4 of the ring has a spherical shape centered about point 0, the center of the ring 1. The weakening of ring 1 at the thinnest portion is accomplished by a radial notch 5 in the spherical outer periphery of the ring.

The ring 1 can move, in accordance with the nature of a spherical articulation, in the V-shaped grooves 6 of the arched runners 7 which, in the illustrated embodiment, are three in number 7a, 7b and 7c, and which, like the ring itself, are made of polytetrafluorethylene, which, in addition to its self-lubricating properties, resists chemical agents, is easily formed, and is compact. Also, the ring is sufficiently deformable to allow it to be mounted on tubing equipped with terminal connections and/or elbows.

The three arched runners, which correspond in form to sections of a body of revolution separated by spaces 11, are shown in FIG. 2 in cross-section. As seen in section, the runners take the shape of a hollow cylinder, whose radially inner surface is V-scored, and whose radially outer surface has a slot which forms an engagement channel for the inner half-collar 9.

The angular evolution of the cylindrical part of the inner half-collar 9 is approximately 270 degrees, this cylindrical part being extended out tangentially to form a securing tab 12 equipped with an oblong securing hole 14, the smallest dimension of the securing hole being parallel to the axis 13 of the ring 1.

The inner half-collar 9 is partially surrounded (about 230 degrees of surface) by an outer half-collar 10. A securing tab 16 of the outer half-collar extends tangentially from the cylindrical part of the outer half-collar at a point obliquely opposite that from which the securing tab 12 juts out from the inner half-collar 9. The securing tab 16 includes a tangential foot 15 which turns 90° to form the securing tab 16 itself. The securing tab 16 is fitted with an oblong securing hole 17 similar to, and in opposition to, securing hole 14.

The half-collars 9 and 10 are rigid, but with sufficient elasticity to allow them to be fitted around the ring. In order to get the benefit of the same thermal expansion coefficient, the half-collars are made of the same material as the tubing to be fitted with clamping-bands—e.g. inoxidizable steel.

The clamping-band of the invention provides the following advantages:

1. Take-up of the vertical misalignment of the tube by use of the eccentric bore. This is accomplished by rotation of the ring 1 about axis 13 which is parallel to the optimal tubing axis, within the limits of the eccentricity of the bore (e.g. 5 mm).

2. The oblong securing holes 14 and 17 provide takeup of the lateral misalignment of the tubing, in a direction parallel to the optimal tubing axis, within the limits of the length of the holes (e.g. 5 mm).

3. The combination of the two preceding features provides take-up of any misalignment whatsoever, parallel to the optimal axis of alignment of the tubing (in a circle of 5 mm diameter).

4. The ball and socket component 4 and 7 of the device provides take-up of the angular deviation of the tubing with reference to its optimal axis of alignment, within the limits of the maximum rotation angle α of the spherical articulation (e.g. 3 degrees).

5. The V-shaped runners provide guidance in the spherical ring when it is clamped, because the runners 7 can be deformed slightly, thus maintaining the cylindricality of the tubing.

Consequently, the combination of all the above features results in the take-up of any sort of positional error of the tubing.

This result is accomplished without compromising the mechanical behavior of the components of the collar, due to temperature change, outside forces or chemical agents.

In addition, the collar of the invention has the advantages of small size and light weight. Its assembly and disassembly are particularly easy; it can be set in place by slipping the split ring around the tubing, which is accomplished by adding to the ring the inside half-collar equipped with attached runners 7, setting in place the outside half-collar, adjusting the various components to take up differences in position, and finally clamping the whole.

The invention is not limited to the design described above. It takes in all variant designs and set-up procedures, notably those in which the split ring 1, the arched runners 7 and the half-collars 9 and 10 are adjusted longitudinally before clamping of the half-collars 9 and 10, and placed in approximately final position before formation of the elbows and brazing and soldering of the ends.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clamping-band comprising:
    a split inner ring having an eccentric bore;
    a rigid inner collar partially surrounding said ring, said inner collar having one end forming a first securing tab;
    a rigid outer collar partially surrounding said ring and inner collar, said outer collar having one end forming a second securing tab positionable in facing opposition to said first securing tab; and
    facing oblong securing holes in said tabs;
    wherein said ring and inner collar include means which together form a ball and socket joint between said ring and inner collar, said ball and socket joint providing rotation of said inner ring about the axis thereof and providing tilting of said axis independent of said rotation of said inner ring,
    wherein said means forming said ball and socket joint comprise a spherical surface located on one of an outer surface of said ring and an inner surface of said inner collar and a cooperating surface engaging said spherical surface and located on the other of said outer surface of said ring and said inner surface of said inner collar.

2. The clamping band of claim 1, wherein said cooperating surface is located on said inner surface of said inner collar and comprises at least one slotted runner.

3. The band of claim 2, wherein said slot of each said at least one runner is V-shaped in transverse section.

4. The band of claim 2 including a plurality of said runners circumferentially mutually separated by gaps.

5. The band of claim 3 including a plurality of said runners circumferentially mutually separated by gaps.

6. The band of claim 4 including three of said runners extending over a portion of said inner collar coresponding to approximately 270 degrees of the periphery of said ring.

7. The band of claim 2 wherein at least the mutually engaging surfaces of said ring and at least one runner are formed of polytetrafluoroethylene.

8. The band of claim 4 including a longitudinal groove on the radially outer surface of each of said runners, said inner collar fitting in said grooves.

9. The band of claim 1 including a weakening slot in said ring at a first position which is circumferentially opposite a gap of said split ring.

10. The band of claim 9 wherein the radial thickness of said ring is at a minimum at said first position.

* * * * *